(12) United States Patent
Yun

(10) Patent No.: US 8,179,097 B2
(45) Date of Patent: May 15, 2012

(54) PROTECTION CIRCUIT FOR BATTERY PACK AND BATTERY PACK HAVING THE SAME

(75) Inventor: Chang-Yong Yun, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 499 days.

(21) Appl. No.: 12/166,179

(22) Filed: Jul. 1, 2008

(65) Prior Publication Data

US 2009/0058362 A1 Mar. 5, 2009

(30) Foreign Application Priority Data

Aug. 30, 2007 (KR) .................. 10-2007-0087519

(51) Int. Cl.
*H02J 7/00* (2006.01)
(52) U.S. Cl. ........................... 320/134; 320/136
(58) Field of Classification Search .................. 320/134, 320/136
See application file for complete search history.

(56) References Cited

U.S. PATENT DOCUMENTS

| | | | |
|---|---|---|---|
| 5,949,218 A * | 9/1999 | Colles et al. ............... | 320/134 |
| 6,322,921 B1 * | 11/2001 | Iwaizono et al. ............ | 429/56 |
| 6,577,105 B1 * | 6/2003 | Iwaizono ..................... | 320/134 |
| 7,595,610 B2 * | 9/2009 | Poff ............................ | 320/134 |
| 2005/0077878 A1 * | 4/2005 | Carrier et al. ............... | 320/134 |
| 2005/0231168 A1 * | 10/2005 | Lin ............................... | 320/134 |
| 2006/0078787 A1 * | 4/2006 | Sato et al. ................... | 429/62 |
| 2007/0257635 A1 * | 11/2007 | Yang ........................... | 320/107 |
| 2009/0051315 A1 * | 2/2009 | Wang et al. ................. | 320/113 |

FOREIGN PATENT DOCUMENTS

| | | |
|---|---|---|
| CN | 1304559 A | 7/2001 |
| JP | 2003-153435 | 5/2003 |
| KR | 2001-0082004 | 8/2001 |
| KR | 10-2003-0075103 | 9/2003 |
| KR | 10-2003-0081934 | 10/2003 |

OTHER PUBLICATIONS

Office action dated Jan. 29, 2009, for corresponding Korean Patent Application No. 10-2007-0087519 listing cited reference.

(Continued)

*Primary Examiner* — M'Baye Diao
(74) *Attorney, Agent, or Firm* — Christie, Parker & Hale, LLP

(57) ABSTRACT

A protection circuit for a battery pack is provided in which a positive temperature coefficient device is electrically connected in a current path of the battery pack to control current flowing through the current path in response to an internal temperature of the battery pack. The protection circuit for a battery pack includes a charging and discharging control unit located on a current path of the battery pack. A first protection circuit controls the charging and discharging control unit in response to a charged state of the battery pack. A second protection circuit prevents overcurrent from flowing through the current path of the battery pack. A positive temperature coefficient is electrically connected in the current path of the battery pack. The battery pack may include a bare cell or battery group including one or more secondary batteries.

11 Claims, 2 Drawing Sheets

OTHER PUBLICATIONS

Korean Notice of Allowability for priority Korean application 10-2007-0087519, noting listed references in this IDS, as well as KR 10-2001-0082004 previously filed in an IDS dated Apr. 28, 2009.

SIPO Office action dated Mar. 14, 2011, for corresponding Chinese Patent application 200810134957.X, with English translation, notin listed reference in this IDS.

SIPO Office action dated Aug. 17, 2011, for corresponding Chinese Patent application 200810134957.X, with English translation, 14 pages.

SIPO Office action dated Mar. 27, 2012, for corresponding Chinese Patent application 200810134957.X, with English translation, 11 pages.

* cited by examiner

PROTECTION CIRCUIT FOR BATTERY PACK AND BATTERY PACK HAVING THE SAME

CROSS-REFERENCE TO RELATED APPLICATION

This application claims priority to and the benefit of Korean Patent Application No. 2007-87519, filed Aug. 30, 2007, in the Korean Intellectual Property Office, the entire content of which is incorporated herein by reference.

BACKGROUND OF THE INVENTION

1. Field of the Invention

The present invention relates to battery packs, and, more particularly, to a protection circuit for a battery pack.

2. Description of the Related Art

Recently, compact and portable electronic/electrical appliances, such as cellular phones, lap-top computers, camcorders and the like, have been actively developed and produced, and require battery packs for portable operations. For economic reasons a battery pack typically includes secondary battery that is rechargeable, such as, a nickel-cadmium (Ni—Cd) battery, a nickel-metal hydride (Ni-MH) battery, and an lithium (Li) battery. Specifically, the battery packs having an Li secondary battery are widely used because the Li secondary battery has an operating voltage three times greater than that of the Ni—Cd battery or the Ni-MH battery, and has an energy density per unit weight greater than that of the Ni—Cd battery or the Ni-MH battery.

Typically, the battery pack includes a battery group having one or more rechargeable secondary batteries, an external terminal for connecting the battery group with an external power supply or a load, a first protection circuit for controlling the charging and discharging of the battery group in response to the charged state of the battery group, a second protection circuit for preventing overcurrent from flowing through the battery group, and a thermal fuse electrically connected between the battery group and the external terminal. The secondary battery may include one or more rechargeable bare cells, but the battery group may even be just one bare cell.

The thermal fuse and the second protection circuit electrically disconnect the battery group from the external terminal to prevent the battery pack from starting a fire, burning or exploding when overcurrent flows through the battery group or the internal temperature of the battery pack gets above a predetermined temperature.

However, since the thermal fuse and the second protection circuit are disposable devices, reuse of the battery pack is made impossible when the thermal fuse and the second protection circuit electrically disconnect the battery group from the external terminal. That is, use of the battery pack becomes impossible despite the fact that the battery pack can be continuously used when the internal temperature of the battery pack decreases, or when the internal temperature of the battery pack temporarily increases above the temperature for activating the thermal fuse.

SUMMARY OF THE INVENTION

In accordance with the present invention a protection circuit for a battery pack is provided which is capable of controlling current flowing through a current path in response to an internal temperature of the battery pack so that reuse of the battery pack is made possible. Otherwise, the battery pack becomes not usable due to the temporary increase in the temperature of the battery pack.

In accordance with the present invention the protection circuit includes a charging and discharging control unit located in a current path of the battery pack. A first protection circuit controls the charging and discharging control unit in response to the charged state of the battery pack. A second protection circuit prevents overcurrent from flowing through the current path of the battery pack in response to overcurrent flowing through the battery pack. A positive temperature coefficient (PTC) device is electrically connected in the current path of the battery pack.

Further, in accordance with the present invention, a battery pack includes a bare cell. A protection circuit substrate is electrically connected to the bare cell and includes a first protection circuit and second protection circuit. A PTC device is located in a current path of the bare cell. External terminals electrically connect the bare cell with an external power supply or a load.

Still further, in accordance with the present invention, a battery pack includes a battery group having one or a plurality of secondary batteries. External terminals electrically connect the battery group with an external power supply or a load. A first protection circuit controls the charging and discharging of the battery group in response to the charged state of the battery group. A second protection circuit disconnects the battery group from the external terminals when overcurrent flows through the battery group. A PTC device is electrically connected between the battery group and the external terminal.

Thus, in the protection circuit for a battery pack and the battery pack having the same in accordance with the present invention, the PTC device is electrically connected in the current path of the battery pack to control the current flowing through the current path in response to the internal temperature of the battery pack. This can increase the reliability and the lifetime of the battery pack when there is change in the temperature of the battery pack and allows for the continuous use of the battery pack. Otherwise, the battery pack is not usable when there is a temporary increase of the internal temperature of the battery pack.

DETAILED DESCRIPTION

Figure 1:
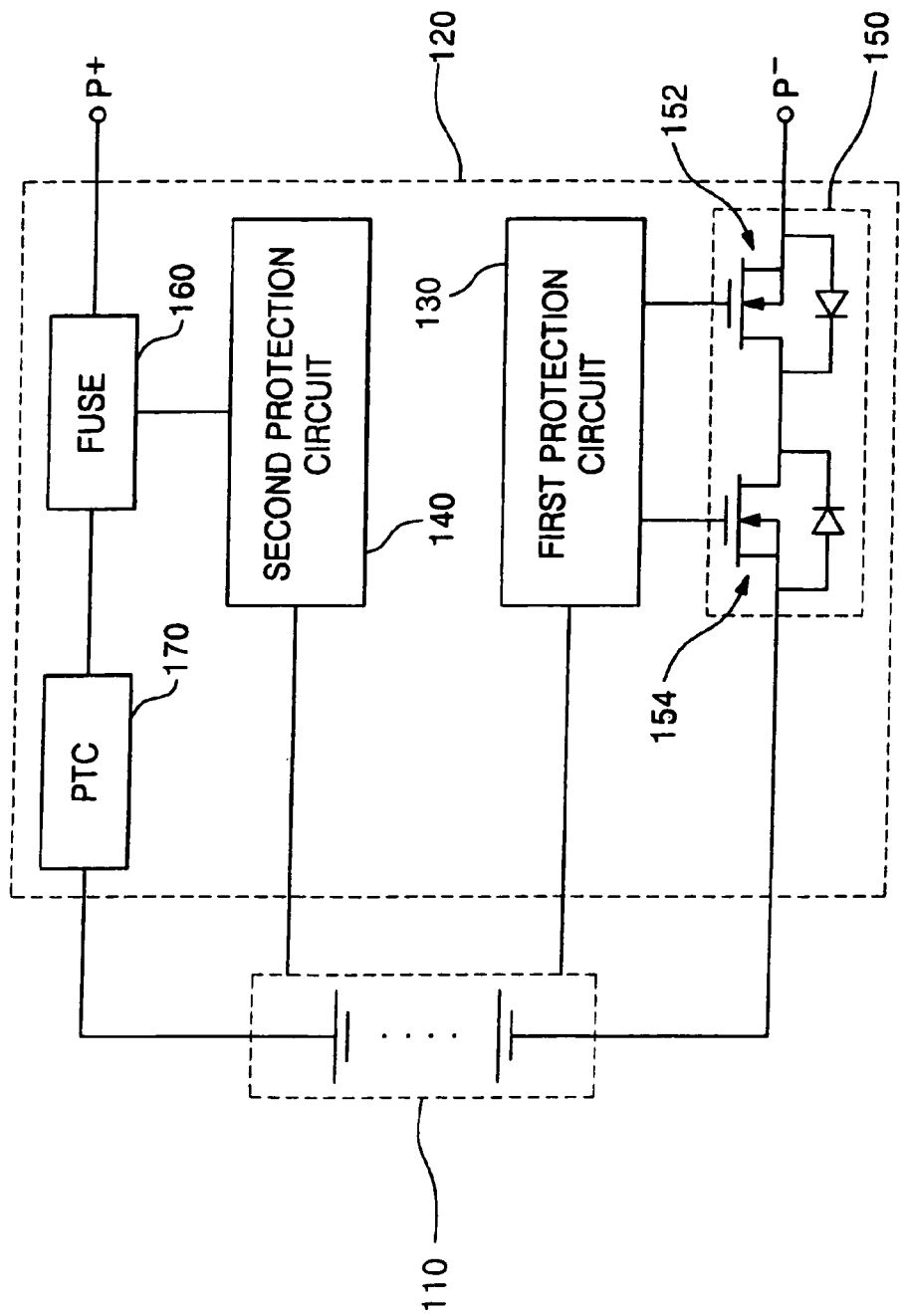
FIG. 1 is a schematic block diagram illustrating a battery pack according to an exemplary embodiment of the present invention.

Referring to FIG. 1, a battery pack according to the first embodiment of the present invention includes a battery cell 110 having one or more rechargeable bare cells. A protection circuit substrate 120 includes a first protection circuit 130, a second protection circuit 140, and a positive temperature coefficient (PTC) device 170 located in a current path of the battery cell 110. External terminals P+ and P− electrically connect the battery cell 110 with an external power supply or a load.

The external terminals P+ and P− are connected in parallel with the battery cell 110 and are a cathode P+ and an anode P−, respectively. The external terminals P+ and P− electrically connect the battery cell 110 with the external power supply or the load to charge or discharge the battery cell 110.

Specifically, the battery cell 110 is charged when the external power supply is connected to the external terminals P+ and P− and discharged when the load is connected to the external terminals P+ and P−.

The protection circuit substrate 120 includes the first protection circuit 130 for controlling the charging and discharging of the battery cell 110 in response to a charged state of the battery cell 110, and the second protection circuit 140 for electrically disconnecting the battery cell 110 from the external terminals when overcurrent flows through the battery cell 110.

The first protection circuit 130 senses the charged state of the battery cell 110, and controls a charging and discharging control unit 150 electrically connected between the battery cell 110 and the external terminal, in response to the charged state of the battery cell 110. The charging and discharging control unit 150 includes a charging field effect transistor (FET) device 154 and a discharging FET device 152. The first protection circuit 130 drives any one of the charging FET device 154 and the discharging FET device 152 to control the charging and discharging operation of the battery cell 110.

The second protection circuit 140 senses the current flowing through the battery cell 110 and controls a fuse 160 located in the current path of the battery cell 110 to disconnect the battery cell 110 from the external terminals P+ and P− when overcurrent flows through the battery cell 110. Here, the second protection circuit 140 may be a self-control protector (SCP), including the fuse 160 located inside an insulator (not shown) located in the current path of the battery cell 110 and electrically connected with the battery cell 110 to blow at a predetermined temperature, and a heating coil (not shown) wounded multiple times and located outside the insulator, in which the current flowing through the battery cell 110 is applied to the heating coil. In an exemplary embodiment, the fuse 160 blows at 110° C. to 130° C. if the fuse is heated or explodes due to a swelling phenomenon, which may occur when a typical process temperature of the battery pack is below 110° C. and the internal temperature of the battery pack is above 130° C.

The PTC device 170 is electrically connected between the battery cell 110 and the external terminals P+ and P−. As shown in FIG. 1, the PTC device 170 is connected in series with the fuse 160 in the current path of the battery cell 110 such that both charging and discharging currents flow through the PTC device 170. The resistance of the PTC device 170 varies with the internal temperature of the battery pack to control the current flowing in the current path of the battery cell 110. When the internal temperature of the battery pack increases, the resistance of the PTC device 170 increases so that the current flowing through the current path of the battery cell 110 decreases. This can prevent the battery pack from starting a fire, burning or exploding as a result of an increasing internal temperature of the battery pack. When the increased internal temperature of the battery pack decreases, the resistance of the PTC device 170 decreases so that normal current flows through the current path of the battery cell 110.

As described above, in the battery pack according to the first embodiment of the present invention, the PTC device is electrically connected in the current path of the battery cell including one or more bare cells to control the current flowing through the battery cell in response to the internal temperature of the battery pack. When the internal temperature of the battery pack increases, the current flowing through the battery cell decreases. When the increased internal temperature of the battery pack decreases, normal current flows through the battery cell. Thus, continued use of the battery pack is made possible.

Figure 2:
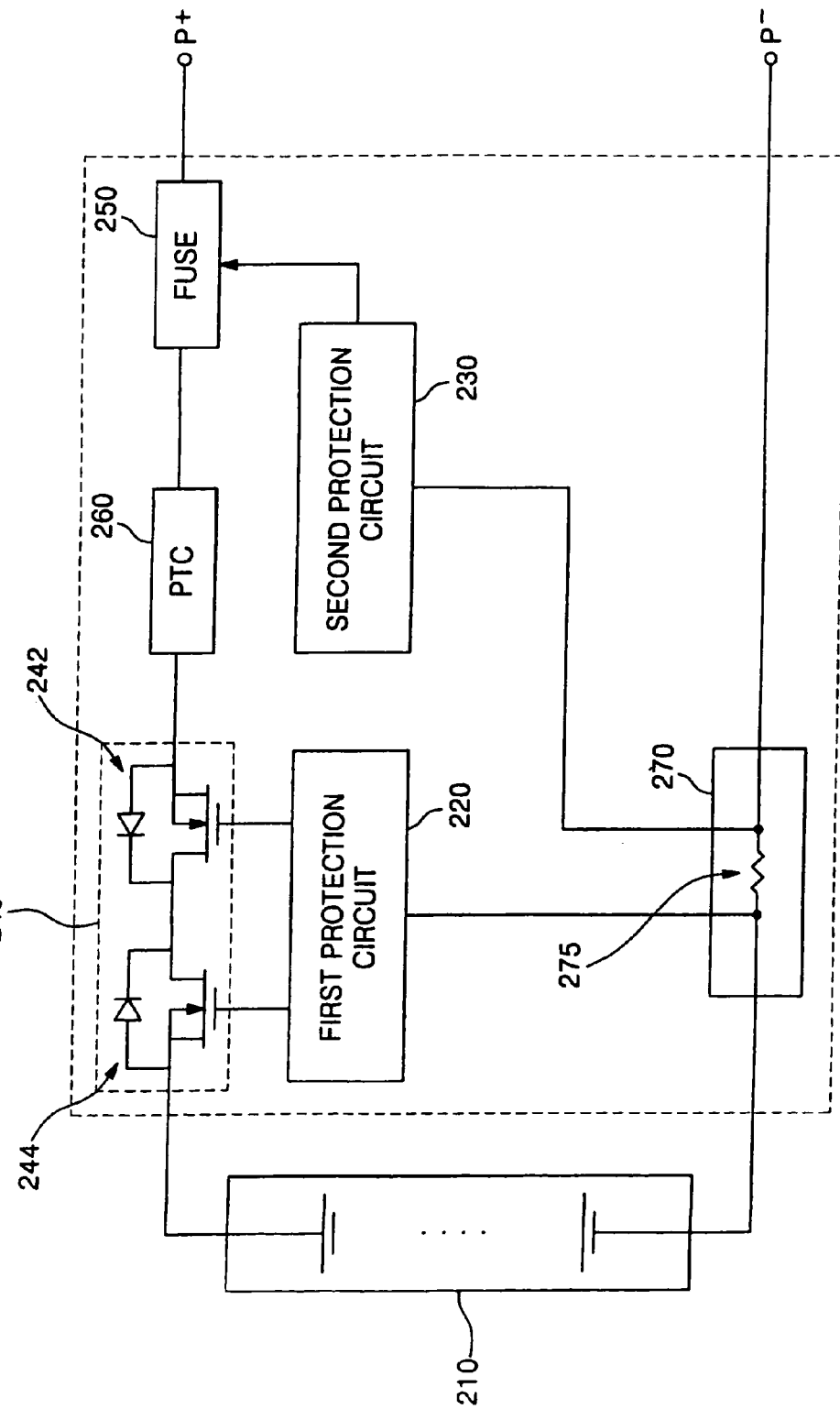
FIG. 2 is a schematic block diagram illustrating a battery pack according to another exemplary embodiment of the present invention.

Referring to FIG. 2, the battery pack according to the second embodiment of the present invention includes a battery group 210 having one or more secondary batteries, external terminals P+ and P− for electrically connecting the battery group 210 with an external power supply or a load, a sensing unit 270 electrically connected between the battery group 210 and the external terminals P+ and P− for sensing a charged state of and overcurrent from the battery group 210, a first protection circuit 220 for controlling the charging and discharging of the battery group 210 in response to the charged state of the battery group 210 sensed by the sensing unit 270, a second protection circuit 230 for controlling an electrical connection between the battery group 210 and the external terminals P+ and P− in response to overcurrent information from the sensing unit 270, and a PTC device 260 electrically connected between the battery group 210 and the external terminals P+ and P−.

The external terminals P+ and P− are connected in parallel with the battery group 210 and include a cathode P+ and an anode P−, respectively. The external terminals P+ and P− electrically connect the battery group 210 with the external power supply or the load to charge or discharge the battery group 210. Specifically, when the external power supply is connected to the external terminals P+ and P−, the battery group 210 is charged, and when the load is connected to the external terminals P+ and P−, the battery group 210 is discharged.

The sensing unit 270 is electrically connected with the battery group 210 for sensing the charged state of the battery group 210 and overcurrent from it. The sensing unit 270 may include a sensing resistor 275 for sensing the overcurrent from the battery group 210. The sensing resistor 275 is electrically connected between the battery group 210 and the external terminal. The sensing unit 270 measures a voltage applied across the sensing resistor 275 to obtain charged and discharged current of the battery group 210.

The first protection circuit 220 receives information on the charged state of the battery group 210 from the sensing unit 270, and controls, in response to the charged state of the battery group 210, the charging and discharging control unit 240 which is electrically connected between the battery group 210 and the external terminal. The charging and discharging control unit 240 includes a charging FET device 242 and a discharging FET device 244. The first protection circuit 220 drives the charging FET device 242 and the discharging FET device 244 to respectively control charging and discharging operation of the battery group 210.

The second protection circuit 230 receives information about current flowing through the battery group 210 from the sensing unit 270, and controls a fuse 250 located in the current path of the battery group 210 to electrically disconnect the battery group 210 from the external terminals P+ and P− when overcurrent flows through the battery group 210. Here, the second protection circuit 230 may include one or more switching devices (not shown) for controlling the fuse 250, and may be an SCP using the fuse 250. In an exemplary embodiment, the fuse 250 blows at 110° C. to 130° C. when the fuse is heated or explodes due to a swelling phenomenon, which may occur when a typical process temperature of the battery pack is below 110° C. and the internal temperature of the battery pack is above 130° C.

The PTC device 260 is electrically connected between the battery group 210 and the external terminals P+ and P−. As shown in FIG. 2, the PTC device 260 is connected in series with the fuse 250 in the current path of the battery group 210 such that both charging and discharging currents flow through the PTC device 260. The resistance of the PTC device 260 varies with the internal temperature of the battery pack to control the current flowing in the current path of the battery group 210. When the internal temperature of the battery pack increases, the resistance of the PTC device 260 increases so that the current flowing through the current path of the battery group 210 decreases. This can prevent the battery pack from starting a fire, burning or exploding as a result of increasing internal temperature of the battery pack. When the increased internal temperature of the battery pack decreases, the resistance of the PTC device 260 decreases so that normal current flows through the current path of the battery group 210.

As described above, in the protection circuit for a battery pack and the battery pack having the same according to the second embodiment of the present invention, the PTC device is electrically connected in the current path of the battery group to control the current flowing through the battery group in response to the internal temperature of the battery pack. When the internal temperature of the battery pack increases, the current flowing through the battery group decreases. When the increased internal temperature of the battery pack decreases, normal current flows through the battery group. Thus, continued use of the battery pack is made possible.

The invention has been described using exemplary embodiments. However, it is to be understood that the scope of the invention is not limited to the disclosed embodiments. On the contrary, the scope of the invention is intended to include various modifications and alternative arrangements within the capabilities of persons skilled in the art. The scope of the claims, therefore, should be accorded the broadest interpretation so as to encompass all such modifications and similar arrangements.

What is claimed is:

1. A protection circuit for a battery pack, the protection circuit comprising:
   a sensing unit configured to sense a charged state of the battery pack and overcurrent flowing through a current path of the battery pack;
   a charging and discharging control unit configured to control a charging and discharging operation of the battery pack;
   a first protection circuit configured to control the charging and discharging control unit in response to information from the sensing unit;
   a fuse configured to prevent overcurrent from flowing through the current path of the battery pack;
   a second protection circuit configured to block the current path in response to overcurrent information from the sensing unit; and
   a positive temperature coefficient device electrically connected in series with the fuse,
   wherein the sensing unit, the charging and discharging control unit, the fuse and the positive temperature coefficient device are located in the current path of the battery pack.

2. The protection circuit according to claim 1, wherein the second protection circuit comprises a self-control protector device.

3. The protection circuit according to claim 1, wherein the charging and discharging control unit comprises a charging field effect transistor device and a discharging field effect transistor device.

4. The protection circuit according to claim 3, wherein the first protection circuit drives any one of the charging field effect transistor device and the discharging field effect transistor device.

5. A battery pack comprising:
   a battery group including one or more secondary batteries;
   a sensing unit electrically configured to sense a charged state of the battery group and overcurrent flowing through a current path of the battery group;
   a charging and discharging control unit configured to control a charging and discharging operation of the battery group;
   a first protection circuit configured to control the charging and discharging control unit in response to the charged state of the battery group transmitted from the sensing unit;
   a fuse configured to prevent overcurrent from flowing through the current path of the battery group;
   a second protection circuit configured to blow the fuse in response to overcurrent information transmitted from the sensing unit;
   a positive temperature coefficient device electrically connected in series with the fuse; and
   external terminals for electrically connecting the battery group with an external power supply or a load,
   wherein the sensing unit, the charging and discharging control unit, the fuse and the positive temperature coefficient device are electrically connected between the battery group and the external terminals in series.

6. The battery pack according to claim 5, wherein the charging and discharging control unit comprises a charging field effect transistor device and a discharging field effect transistor device.

7. The battery pack according to claim 6, wherein the first protection circuit drives any one of the charging field effect transistor device and the discharging field effect transistor device.

8. The battery pack according to claim 5, wherein the fuse is configured to electrically disconnect the current path of the battery group under control of the second protection circuit.

9. The battery pack according to claim 5, wherein the second protection circuit comprises a self-control protector device.

10. The battery pack according to claim 5, wherein the sensing unit comprises a sensing resistor for measuring current flowing through the battery group.

11. The battery pack according to claim 5, wherein the one or more secondary batteries comprise one or more bare cells, respectively.

* * * * *